United States Patent Office 3,044,944
Patented July 17, 1962

3,044,944
METHODS OF PREPARATION OF ELEMENT 95
Glenn T. Seaborg, Chicago, Ill., and Ralph A. James, Berkeley, Calif., assignors to the United States of America as represented by the United States Atomic Energy Commission
No Drawing. Filed Aug. 23, 1946, Ser. No. 692,731
17 Claims. (Cl. 204—154.2)

The present invention relates to a new transuranic element. More particularly it is concerned with the transuranic element having atomic number 95, now known as americium having the symbol Am, isotopes thereof, compositions containing the same, and methods of producing and purifying said element and compositions thereof.

The expression "element 95" is used throughout this description to designate the element having atomic number 95. Reference herein to this element is to be understood as denoting the element generically whether in its free state or in a form of a compound, unless otherwise indicated by the context.

As far as is presently known two isotopes of americium have been synthesized in identifiable quantities, i.e., $_{95}Am^{241}$ and $_{95}Am^{242}$. The former isotope is an alpha emitter having a half-life of 500 years, while the latter is a short-lived (17–18 hours half-life) beta emitter which is transformed relatively rapidly into element $96^{242}$, known as curium and having the symbol Cm, an isotope of another new transuranic element and an alpha emitter having a half-life of about five months. The alpha particles emitted from this isotope have a range in air of 4.75 cm. A second isotope, $_{96}Cm^{240}$, is produced by the bombardment of $94^{239}$ with alpha particles. This isotope has a half-life of thirty days and is also an alpha emitter. The alpha particles produced thereby have a range of 5.0 cm. in air.

In accordance with the present invention, it has been found that these isotopes of element 95 can be produced in a variety of ways such as, for example, by bombarding plutonium produced in a neutronic reactor, which consists essentially of isotope $94^{239}$ together with a relatively small concentration of isotope $94^{240}$, with subatomic particles having an atomic mass greater than one, e.g., deuterons or neutrons. In perparing element 95 by the bombardment of plutonium with deuterons, for example, these subatomic particles should generally have energies of the order of at least 10 mev. and preferably energies of 14 to 16 mev. or higher. The synthesis of element 95 in this manner is throught to involve at least a portion and very probably all of the nuclear reactions indicated below:

$$94^{240} + {}_1d^2 \rightarrow 95^{241} + {}_0n^1$$
$$94^{240} + {}_1d^2 \rightarrow 95^{240} + 2{}_0n^1$$
$$94^{240} + {}_1d^2 \rightarrow 94^{241} + {}_1p^1$$

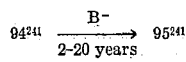
$94^{241} \xrightarrow[2-20 \text{ years}]{B-} 95^{241}$

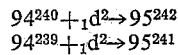
$$94^{240} + {}_1d^2 \rightarrow 95^{242}$$
$$94^{239} + {}_1d^2 \rightarrow 95^{241}$$

In general, it has been found that element 95 is most conveniently synthesized in a neutronic reactor operated at a relatively high power level (about 200,000 kw.) for an extended period of time (approximately 100 days). A suitable neutronic reactor which may be employed in the preparation of element 95 is described and claimed in co-pending application for United States Letters Patent, Serial No. 568,904 of Enrico Fermi and Leo Szilard, filed December 19, 1944, and granted as U.S. Patent No. 2,708,656 on May 17, 1955. In such reactors a fissionable isotope, such as $U^{235}$ in natural uranium, undergoes fission and releases fast neutrons in excess of the neutrons absorbed in the fission process. The fast neutrons are slowed down to approximately thermal energies by impacts with a moderator such as graphite or deuterium oxide, and the resulting slow neutrons (energies of 0–0.3 electron volt) are then absorbed by $U^{235}$ to produce further fission and by $U^{238}$ to produce $U^{239}$ which decays through $93^{239}$ to $94^{239}$. This self-sustaining chain reaction releases tremendous amounts of energy, primarily in the form of kinetic energy of the fission fragments. With such reactors the maximum reaction rate for steady state operation is determined by the maximum rate at which the heat of reaction can be removed. The rate of production of plutonium in such reactors may thus be equated, approximately, to the power output of the reactor, and amounts to about 0.9 gram of $94^{239}$ per megawatt day when operating with sufficient bombardment and aging times to permit total decay of $93^{239}$ to $94^{239}$.

A portion of the $94^{239}$ thus produced in the reactor under such conditions absorbs neutrons to form the isotope $94^{240}$. In neutronic reactors operated under the general conditions of power level and time indicated above the absorption cross-section of $94^{239}$ for the formation of $94^{240}$ is rather large, amounting for thermal neutrons to nearly one-half the cross-section for the fission of $94^{239}$. Thus plutonium produced in the above manner frequently contains as much as 2% of the isotope $94^{240}$. The latter isotope is an alpha emitter and also undergoes spontaneous fission to a slight extent (half-life for the process is $10^{11}$ years). If this isotope is maintained in a neutronic reactor for a substantial period after its formation, it is transformed into the next heavier isotope which, in general, constitutes about .01 percent of the total plutonium produced under conditions of power level and time indicated above. As previously pointed out, $94^{241}$ is a beta emitter and decays into $95^{241}$.

In a natural uranium pile, or neutronic reactor operating at such substantial powers and for substantial periods of time, the formation of element 95 (isotopes $95^{241}$ and $95^{242}$ $96^{242}$) is presumed to be synthesized in accordance with the following series of nuclear reactions:

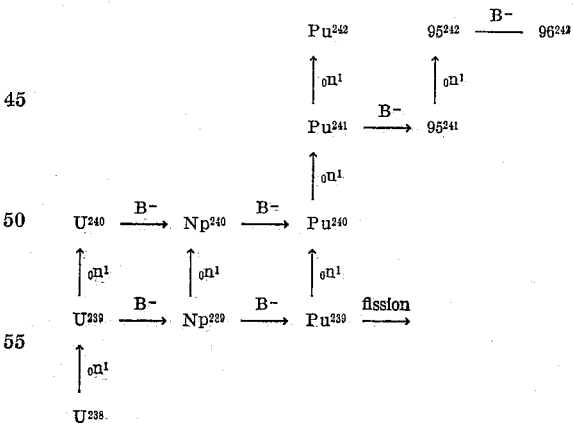

The mechanism of formation of $94^{241}$ as indicated by the nuclear reactions written above is such that its concentration in pile uranium is proportional to the third power of the specific neutron exposure and the ratio of its concentration to that of $94^{239}$ is proportional to the second power of the specific neutron exposure. Hence, the amount of $95^{241}$ which is formed per day per unit of plutonium in the free or combined state is proportional to the second power of the specific neutron exposure of the uranium from which the plutonium was formed. Inasmuch as the decay of $94^{241}$ to $95^{241}$ occurs during as well as after the neutron bombardment period, the percentage of the latter in the transuranic fraction can be controlled by varying the time of bombardment, the time of aging subsequent to bombardment of uranium, or both.

From an inspection of the above proposed nuclear reactions, it will be apparent that the formation of element 95 is dependent on the concentration of $94^{241}$ which is in turn dependent upon the amount of $94^{239}$ produced. Also, while the desired concentration of element 95 in the transuranic fraction of the product may be obtained by sufficient bombardment alone, it will be evident that a finite aging time will ensue before the separation of element 95 from the bombarded product can be effected. In the present description, therefore, it can be assumed that the bombarded product is always aged and that the concentration of element 95 in the transuranic fraction of the product is controlled by the total bombardment time plus aging. The figures below are indicative of the proportion of $95^{241}$ to $94^{239}$ in a neutron bombarded uranium pile operating at a neutron flux of $10^{13}$ neutrons/cm²/sec. and at varying concentrations of $94^{239}$.

| $Pu^{239}$ gm./ton of Uranium | $95^{241}$ mg./ton of Uranium |
|---|---|
| 200 | 0.009 |
| 400 | 0.16 |
| 600 | 0.92 |
| 800 | 3.27 |
| 1,000 | 9.16 |

It will be apparent that element 95 can be synthesized at neutron fluxes considerably lower than $10^{13}$ neutrons/cm²/sec.; however, at such intensities the formation of element 95 will be proportionately slower. In general, however, it will be found that neutron fluxes of at least $10^{13}$ neutrons/cm.²/sec. or higher are preferable.

Element 95 may be obtained from plutonium which has been previously isolated from uranium irradiated in a neutronic reactor of the type mentioned above. In one suitable method of recovering plutonium from uranium, neutron bombarded uranium is dissolved in an aqueous solution of a suitable acid such as, for example, nitric acid and the resulting solution, which contains the plutonium in the tetravalent state and the uranium in the hexavalent or noncarriable state, is contacted with a substantially insoluble, solid, finely divided compound which is a plutonium carrier. The carrier precipitate thus obtained containing plutonium is next separated from solution by any convenient means such as, for example, centrifugation or filtration after which the product precipitate is again dissolved and the plutonium removed from solution by a carrier which is chemically distinct from the one first used. This procedure can be repeated if necessary. Also, a third carrier different in chemical composition from the first two mentioned may be utilized in a third precipitation. The advantage of these alternate carriers lies in the fact that certain impurities present in the process solution can be eliminated by employing a plutonium carrier that does not remove particular impurities with it. By proper selection and repeated application of such carriers, it will be seen that the separation of plutonium in the form of a relatively pure compound can be readily effected.

Metallic plutonium can be obtained by means of high temperature reduction of a suitable halide thereof such as, for example, plutonium trifluoride, with a reactive metal such as lithium, calcium, barium, etc.

Element 95 present in the plutonium obtained in accordance with the procedure generally outlined above may be isolated therefrom by first allowing the plutonium to age for a desired period of time in metallic or solution form, for example, a salt solution such as a solution of plutonous nitrate, after which the bulk of the plutonium is separated from element 95 by the addition of a soluble peroxide to the solution thereby converting plutonium to its substantially insoluble peroxide and leaving element 95 in solution as a soluble peroxide. The last traces of plutonium which amount to about 1–5% of the plutonium originally present in solution can be removed by performing a series of precipitation cycles which involve first destroying the excess peroxide in solution by heating and then converting element 95 and the remaining plutonium to their hydroxides by the addition of a suitable base such as, for example, ammonium hydroxide, whereby the plutonous hydroxide carries from solution element 95 in the form of its insoluble hydroxide. The resulting precipitate is then dissolved in concentrated nitric acid or other suitable acid to form a solution of substantially less volume than the original, after which plutonium and element 95 are converted to their respective peroxides and the above cycle repeated until analysis of the hydroxide precipitate by a pulse analyzer or other suitable alpha pulse responsive means indicates that the alpha radiation of the precipitate emanates substantially completely from the element 95 content thereof. Impurities which form insoluble hydroxides, such as iron and aluminum, if present in interfering concentrations, can be conveniently separated from element 95 by utilizing a carrier for the plutonium and element 95 which, under certain conditions, will carry these two elements leaving iron and aluminum in solution. A suitable carrier for this purpose has been found to be potassium plutonous fluoride, $K_2PuF_6$. Separation of aluminum and iron from plutonium and element 95 is accomplished by adding potassium ions, for example, in the form of potassium nitrate, to the aforementioned solution of decreased volume formed by dissolving the plutonous hydroxide product precipitate in nitric acid, after which sufficient hydrofluoric acid is introduced to make the resulting solution about 1 M with respect to both hydrofluoric acid and potassium nitrate. Under these conditions the iron and aluminum fluorides are soluble, whereas the fluoride of element 95 is insoluble and is carried from solution by the insoluble $K_2PuF_6$. The latter then can be converted to the sulfate by fuming with sulfuric acid, the sulfate dissolved in water, and the plutonium and element 95 again precipitated in the form of their hydroxides by addition of ammonium hydroxide thereto. After the removal in this manner of aluminum and iron or other impurities whose hydroxides are insoluble, further separation of the plutonium from element 95 by utilization of the hydroxide-peroxide precipitation cycle described above can be effected.

Element 95 is also found to be present in the fission product precipitates obtained as by-products of precipitation methods for the recovery of plutonium from neutron-irradiated uranium when these precipitates are obtained by bombardment of plutonium-containing uranium in a neutronic reactor operating at substantial powers for substantial periods of time. The element is present in these precipitates since it resists oxidation conditions under which plutonium is oxidized to a valence state greater than $+4$ and hence is removed from solution along with fission products, which consist chiefly of rare earth elements, as a result of the carrying step. In separating element 95 from solutions containing fission products and that element, the radioactive zirconium and barium present are removed prior to the separation of the rare earth elements. Thus, zirconium can be readily separated from such solutions by contacting the latter with a suitable carrier such as, for example, ceric iodate, while the radioactive barium is separated from element 95 by precipitating the latter in the form of its hydroxide in the presence of a suitable carrier, for example, cerous hydroxide.

In instances where bombardment periods are extensive, it is apparent that appreciable quantities of element 95 will be formed during such periods as a result of the beta decay of $94^{241}$. Thus, any of the $95^{241}$ isotope so produced passes into the fission product fraction during the separation of plutonium from said fission products by precipitation of the fission products from an aqueous solution containing plutonium in the hexavalent state. Because of the similarity of the chemical properties of the rare earths and element 95, as well as element 96, the major difficulties encountered in the decontamination of these elements are in the separation of the radioactive rare earth elements therefrom. This object can be satisfactorily accomplished, however, by precipitating the rare earths in the presence of fluosilicate ions. Under these conditions element 95 appears to be converted to a soluble complex, and the rare earths are removed by repeated precipitation with a suitable rare earth carrier such as, for example, lanthanum or cerous fluorides. After removal of said rare earths in this manner, element 95 is separated from solution by carrying with a suitable rare earth fluoride in the presence of hydrofluoric acid. In a preferred embodiment of the above procedure the initial solution containing element 95 and fission products is made about 3 M in nitric acid and 1 M in fluosilicic acid, after which a quantity of a suitable trivalent salt of a rare earth metal such as, for example, cerium is added and the resulting solution is allowed to stand until precipitation of the insoluble cerous fluoride and cerous fluosilicate thus formed appears to be complete. Such an operation results in the removal of about 90% of the rare earths present together with a relatively small quantity of element 95, i.e., about 10%. The quantity of element 95 in the supernatant solution can then be removed by caking the solution from about 3-6 M in hydrofluoric acid, after which additional trivalent cerium is introduced whereby element 95 is carried down with the cerous fluoride thus formed. This cycle can be repeated as many times as is considered necessary or desirable.

As examples of compounds suitable for use in carrying element 95 from the above mentioned types of solutions in addition to those already enumerated, there may be mentioned compounds of low water solubility (less than 0.01 mol per liter) such as bismuth oxalate, bismuth phosphate, manganese dioxide, and the insoluble rare earth metal compounds such as the oxalates, iodates and fluorides thereof, and the like. Other insoluble carriers such as, for example, bismuth phosphate, also function satisfactorily, especially in solutions of low acidity. In this connection it may be mentioned that the carriers listed above are likewise useful in removing fission products from solution when element 95 is in a noncarriable form, such as, for example, in the form of a fluosilicate complex. Additional carriers for this purpose are zirconium phosphate and zirconium iodate.

Inasmuch as various members of the class of carriers mentioned above possess the peculiar property of removing certain impurities from solution together with element 95 while not removing other impurities, such a property may be utilized in separating the aforesaid element by employing alternate carriers capable of removing different impurities. The alternate use of $K_2PuF_6$ and $Pu(OH)_4$ as carriers for element 95 is a typical example of the principle contemplated by the foregoing statement.

The insoluble carrier employed may be introduced into the solution as a pre-formed finely divided solid, but it is preferably precipitated directly in the solution from which element 95 is thereby carried. The mechanism of the carrying of element 95 from solution is not accurately understood. However, it is believed it is effected in some cases, at least, by incorporation of element 95 ions into the carrier crystal lattice (frequently known as isomorphic carrying), in some cases by surface absorption of element 95 ions, and in other cases by combination of both.

The term "carrier" as applied to element 95 herein and in the appended claims is to be understood as signifying a substantially insoluble, solid, finely divided compound capable of ionizing to yield at least one inorganic cation and to yield at least one anion which constitutes an ionic component of a compound which contains the ion to be carried, said latter compound being not substantially more soluble in the same solution than said finely divided compound. The preferred carriers for element 95, at least in its trivalent state, comprise compounds having an anion which is capablbe of forming an insoluble compound with a rare earth metal, such as lanthanum or trivalent cerium, in the same solution. The term "insoluble" is used herein to designate compounds which have solubilities in water of the order of 0.01 mol/liter or below.

In separating element 95 from highly radioactive contaminants such as are most of the fission products of uranium and plutonium, it is desirable to minimize the carrying of such radioactivity associated therewith. One method of reducing the amount of radioactivity carried by a carrier precipitate is to introduce into the solution a radioactively inert diluent or "hold-back carrier" which is an inactive isotope of the radioactive isotope to be held back in the supernatant solution during precipitation of the carrier. This method is partcularly effective for reducing the carrying of the radioactive isotopes carried by absorption or other surface saturation type of carrying. Thus, inactive isotopes of the various uranium or plutonium fission products which are not isomorphic with the carried cation may be employed to improve the decontamination of element 95 when carrying it from solutions derived from either neutron irradiated uranium or plutonium.

The carrying procedure may be effected by any of the known techniques for effecting adequate contact of liquids with insoluble solids. In the case of pre-formed carriers the finely divided solid may be agitated with the solution or the solution may be continuously passed through fixed beds of the carrier. As previously pointed out, the preferred procedure is to precipitate the carrier directly in the solution containing element 95. This operation may be accomplished by adding the ion components of the carrier in any order; however, it is generally preferred to add the cation first and then the anion. Mixed carriers may be precipitated if desired by precipitating two or more cations with the same anion, two or more anions with the same cation, or by co-precipitating carriers differing in both cation and anion.

When employing any of the above procedures it is desirable to provide an adequate contact time or digestion period to insure adequate carrying of the element 95. This is particularly desirable in the case of isomorphic carrying or other internal carrying. The digestion may be effected at room temperature, but it is usually preferred to employ an elevated temperature ranging from about 30° C. to a temperature substantially below the boiling point of the solution. Temperatures of 40 to 60° C. will generally be satisfactory, with a contact time or precipitate digestion time of 10 to 90 minutes, and preferably 30 to 60 minutes. The carrier may then be separated from the supernatant solution by any suitable means, such as decantation, filtration or centrifugation.

In addition to the above method for separating element 95 from solutions thereof containing commonly associated impurities, separation of that element from such solutions may also be effected by the utilization of a suitable substantially water immiscible solvent which exhibits a special selective solvent action on element 95 or on the impurities with which it is associated. Likewise, qualitative separation of element 95 by the afore-mentioned extraction process from a certain group of impurities normally associated therewith such as, for example, compounds of the rare earth metal group, is also contemplated by the present invention.

In its chemical and physical properties element 95 in numerous respects differs widely from plutonium and resembles rather closely the rare earths as pointed out above. For example, element 95 is highly resistant to either vigorous oxidation or reduction, and while certain evidence has indicated that this element does possess states of valence other than +3, the latter oxidation state has been found to be by far the most stable. The absorption spectrum of trivalent element 95 in an aqueous nitric acid solution has been determined and, aside from a general absorption in the ultraviolet range, there are only two marked absorption peaks between 320 and 1100 millimicrons; one in the visible range at 503±1 millimicrons. The peak at 503 millimicrons is sharp with a molar extinction coefficient of at least 300. The molar extinction coefficient of the peak at 815 millimicrons is about 50. Addition of potassium bromate to a nitric acid solution of element 95 results in the disappearance of the sharp peak at 503 millimicrons in a period of about 15 minutes after which a slow recline of the peak occurs. This phenomenon appears to be conclusive evidence for the oxidation of trivalent element 95 to a higher oxidation state. Under such conditions element 95 may be oxidized to the tetravalent state, the pentavalent state or to an even higher valence. In this connection it should be pointed out that potassium bromate is the only oxidizing agent employed thus far which has been found to be capable of converting said element to a higher state of oxidation. Even such a relatively strong oxidizing agent as argentic ion has been unsuccessful in attempts to oxidize element 95 to the tetravalent or higher state.

Element 95 is capable of forming various organic complexes with compounds which contain an atom capable of supplying a pair of electrons to a coordinate bond and thus form a coordination type of compound. Thus, compounds which are capable of forming at least one coordinate bond and at least one other linkage such as a polar or nonpolar bond with a metal atom will form complexes with element 95. Compounds of this type include acids or alcohols which contain atoms capable of supplying electrons to a coordinating metal such as $N\equiv$, $-C=O$, $-O-$, $-S-$, $-NH_2$, $=NH$, etc. For example, element 95 forms a complex with benzohydroxamic acid which has the following probable structure:

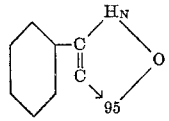

This compound is soluble in organic solvents such as chloroform. Consequently element 95 may be removed from aqueous solution by agitation of the solution with a complexing agent of this type for 24–48 hours, and then extracting the solution with chloroform or equivalent solvent. Other acids or compounds containing trivalent nitrogen or similar atoms such as glycine, cupferron, salicylaldehyde, pyruvic acid, acetoacetic acid, etc., may be used in similar manner.

Element 95 also may be removed from aqueous solutions by reaction with a base exchange acid or salt such as the zeolite, or "Amberlite IR" resins which are a resinous condensation product of a phenol sulphonic acid or sulphonate and an aldehyde such as formaldehyde. For example aqueous solutions containing element 95 and rare earth fission products may be contacted with "Amberlite IR–1," a resin formed by reacting tannin with sodium bisulphate and condensing the product with formaldehyde. In such a case the element 95 is adsorbed to form a salt of 95 and the base exchange acid. This product which also contains rare earth or other metals when they are present in the aqueous solution may be selectively eluted using a solution of citric acid having a pH of about 2.5 and under such a case the 95 together with elements 61 and 62 may be eluted from the remaining rare earth elements which have been adsorbed.

The fact that the peroxide of element 95 is much more soluble than plutonium peroxide makes possible a satisfactory method for separating these elements, although the hydroxide of element 95 is substantially insoluble and is readily carried from solutions by plutonous hydroxide.

Volatilization tests indicate that at 1100° C. element 95 is approximately 100 times more volatile than plutonium.

Numerous compounds of element 95 have been prepared and certain of their properties noted. Typical of those compounds which have been synthesized are the hydroxide, the dioxide, the iodate, the trifluoride, and the trichloride. The procedures employed in the synthesis of these compounds as well as their various physical properties are given below.

The hydroxide of element 95 is relatively insoluble and can be formed by neutralizing a nitric acid solution of element 95. The hydroxide precipitates in the form of a gelatinous mass and is white to pale pink in color. In solutions 4 M in ammonium hydroxide the hydroxide of element 95 is soluble to the extent of about 10 mg./l.

The anhydrous trichloride of element 95 is prepared by reacting the dioxide with carbon tetrachloride at about 750° C. Under such conditions a light yellow sublimate is obtained whose X-ray diffraction pattern is typical of the trivalent rare earth chlorides. This compound melts at approximately 730° C.

The dioxide of element 95 constitutes the only clear evidence that this element has a stable tetravalent state. This compound may be prepared by igniting either the hydroxide or the nitrate. In the dry state the oxide is black; however, in water it dissolves and reverts to the trivalent state to form a solution that is pink to violet in color. The X-ray diffraction pattern of the compound indicates a dioxide having a cubic face centered lattice with a constant, $a=5.37\pm.01$ A.

The iodates and trifluoride of element 95 have also been prepared by adding the respective acid to a solution containing element 95 which is about 0.25 N in nitric acid. The hydrogen iodate or hydrogen fluoride is generally added in an amount sufficient to render the solution approximately 0.1 N with respect to the particular acid introduced. The iodate and trifluoride appear as cream colored gelatinous precipitates.

In addition to the various compounds of element 95 specifically described above other compounds of that element such as the organic salts and organic complexes thereof as well as additional mineral acid salts may be prepared. Such compounds include the acetates, propionate, oxalate, tartrate, and citrate of element 95.

Element 95 may be obtained as the free metal by reduction of the oxide, fluoride, chloride, carbide, etc., with a highly active metal such as, for example, barium, calcium, magnesium, aluminum, etc., by employing temperatures at or in the vicinity of the melting point of element 95.

The element in uncombined form may also be obtained by the electrolysis of suitable aqueous solutions thereof or by the electrolysis of molten salts of element 95 such as the chloride or fluoride in the presence or absence of alkali or alkaline earth metal halides.

The present invention may be further illustrated by the following specific examples:

Example 1

A sample of neutron bombarded plutonium weighing 21.6 mg. was dissolved in 9 ml. of 1.5 M nitric acid. The beta contaminants in this solution amounted to 309 millicuries. The plutonium was precipitated from solution in the form of its hydroxide by addition of an excess of sodium hydroxide, after which the precipitate thus obtained and which contained element 95 was separated by centrifugation and washed. The precipitate was next dissolved in concentrated nitric acid diluted to 10 ml. and thereafter heated at 90–100° C. for eighteen hours. 1 mg. each of barium and strontium ions were next added as hold-back carriers, after which lanthanum fluoride was precipitated in the solution by the addition of 0.2 mg. lanthanum ions and hydrofluoric acid which had been treated with potassium bromate to remove any reducing agents that might have been present. The precipitate thus obtained was separated by centrifugation, washed, and then heated with 1 ml. of 20% sodium hydroxide to convert the lanthanum, plutonium, and element 95 to their corresponding hydroxides. This mass was next dissolved in concentrated nitric acid, 0.2 mg. of argentous ion and a large excess of ammonium persulfate were added, the resulting mixture diluted to 2 ml. giving a solution 2 M in nitric acid, after which the latter was allowed to stand for one hour. Element 95 was then carried from solution by a lanthanum fluoride carrier formed by the addition of hydrofluoric acid. The lanthanum fluoride precipitate thus obtained was next metathesized with 20% sodium hydroxide solution in the manner set forth above, after which the mixture of converted hydroxides was dissolved in concentrated nitric acid. This solution was diluted to 2 ml. (1 M in nitric acid), made 0.05 M in potassium dichromate, and then heated to 90–100° C. for sixteen hours, after which element 95 was again carried from solution with lanthanum fluoride by the addition of hydrofluoric acid thereto. Under the foregoing conditions any plutonium which might have been present is substantially completely removed. At this stage of the separation process the lanthanum fluoride precipitate thus obtained was analyzed for its plutonium and element 95 content by measuring its alpha radiation with a proportional counter. A total of 195,000 counts per minute was recorded, 30,000 of which were attributable to element 95. The beta radiation was measured by means of a calibrated electroscope and was found to be 134 millicuries. The aforesaid lanthanum fluoride precipitate was next metathesized with 20% sodium hydroxide as previously described and the metathesized product dissolved in concentrated nitric acid, after which 0.2 mg. of argentous ion and an excess of ammonium persulfate were added. This solution was then diluted to 2 ml. (2 M in nitric acid), allowed to stand for one and one-half hours whereby the plutonium present therein was oxidized to the hexavalent state. Hydrofluoric acid was next added, and the lanthanum fluoride precipitate thus obtained was separated by centrifugation, washed, and again metathesized as above. The resulting product was dissolved in concentrated nitric acid, the solution diluted and precipitation again effected by the addition of ammonium hydroxide. This precipitate was next dissolved in concentrated nitric acid to give a solution 3 M with respect thereto, after which sufficient phosphoric acid was added to make the solution 0.1 M therein. To this solution tetravalent zirconium ions were added in a concentration of 0.1 mg. per ml., and the resulting mixture allowed to digest for 15 minutes at 50° C. The zirconium phosphate precipitate thus formed removed a substantial portion of the plutonium fission products present leaving element 95 in solution together with a quantity of rare earth activities. Element 95 and the aforesaid rare earths were then removed by adding ammonium hydroxide thereto, causing the rare earths and element 95 to precipitate as hydroxides. This hydroxide precipitate was dissolved in concentrated nitric acid to give a solution 3 M therein, made 1 M in fluosilicic acid and 0.1 M in hydrofluoric acid, after which lanthanum ions were added in a concentration of 7.5 mg. per ml. and the mixture allowed to stand for one hour. The lanthanum fluoride precipitate thus obtained carried with it substantially all of the rare earth activities present in solution. After precipitation appeared to be complete, the precipitate was separated as above and the element 95 present in the mother liquor was precipitated as the hydroxide by adding ammonium hydroxide. This precipitate was then dissolved in concentrated nitric acid, the resulting solution adjusted to an acidity of 5 M and lanthanum ions added in a concentration of 7 mg. per ml. at a temperature of about 35° C. Thereafter 2.5 M fluosilicic acid was added over a period of one hour to give a solution which was 3.5 M in nitric acid, 0.8 M in fluosilicic acid and having a concentration of lanthanum ions of 5 mg. per ml. The precipitate thus obtained consisted essentially of lanthanum fluoride and lanthanum fluosilicate while the supernatant solution on analysis of an aliquot thereof indicated that a total of 20,000 counts per minute of element 95 was present. The beta radiation in solution had been diminished to a total of 0.17 millicurie. After repeating the above-mentioned fluosilicate precipitation two more times, a supernatant solution was obtained which contained a total of 14,000 counts per minute of element 95, the beta contamination being present only to the extent of 0.001 millicurie. By carrying out the above procedure, an over-all recovery of 35% was achieved, based on the total concentration of element 95 originally present. The over-all decontamination factor attained was of the order of $1 \times 10^5$.

Example II

A sample of plutonium containing 0.015% of the beta emitting isotope $94^{241}$, after having been aged for a period of five weeks, was dissolved in 1.5 M nitric acid, after which the plutonium present therein was substantially completely precipitated in the form of its peroxide by the addition of an excess of aqueous hydrogen peroxide (30% $H_2O_2$ by weight). After the plutonium peroxide was separated by centrifugation, the supernatant solution was heated to decompose the peroxide present. The plutonium remaining in solution (50 mg.–0.25 mg./ml.) was removed in the form of its hydroxide by the addition of ammonium hydroxide thereto, thereby carrying 98% of element 95 with it. The precipitate thus obtained was next dissolved in 3 ml. of concentrated nitric acid and the plutonium again removed from solution by peroxide precipitation as described above. To the resulting supernatant solution (plus washings and the plutonium peroxide precipitate) which contained a total of 0.5 mg. of plutonium was added potassium nitrate and then hydrofluoric acid, each in an amount sufficient to render the resulting solution of 1 M therein. The insoluble $K_2PuF_6$ thus formed removed element 95 but left in solution impurities such as iron, aluminum, etc., which form insoluble hydroxides. More than 90% of element 95 was carried in this step. The $K_2PuF_6$ was next converted to the sulfate by fuming with sulfuric acid, after which it was dissolved in water, the hydroxide precipitated with ammonium hydroxide, and then this precipitate separated and dissolved in nitric acid. Plutonium peroxide was again precipitated, this time from a volume of 50 μl. Upon decomposition of hydrogen peroxide in the mother liquor, a gelatinous precipitate was observed to form. On addition of hydrofluoric acid to the solution a light crystalline fluoride precipitate appeared, while the gelatinous precipitate dissolved. This fluoride precipitate was next converted to a sulfate by fuming with sulfuric acid. On analysis the sample thus obtained was observed to contain element 95 in the amount of $1.4 \times 10^7$ cm. The precipitate which had been fumed with sulfuric acid was dissolved in water, precipitated as the hydroxide and then dissolved in nitric acid, and the resulting solution evaporated completely to dryness to remove excess acid. This residue was then dissolved in 2 μl. of 0.1 M nitric acid, after which was added thereto a 30% solution of hydrogen peroxide which resulted in the precipitation of the plutonium present therein. Radioassay of the precipitate indicated that 5 μg. of plutonium had been removed. This procedure was repeated, precipitating from an even smaller volume (0.75 μl.) with very little, if any, plutonium peroxide being formed. The amount of plutonium remaining with element 95 appeared to be very insignificant. A count of the entire sample was made in a vacuum low geometry chamber. The total count of element 95 was found to be $1.13 \times 10^7$ cm.

It is to be understood that the specific compounds described above and the foregoing examples are merely illustrative of the present invention and are in no way to be construed as limitative thereof. It will be apparent to those skilled in the art that the general procedure set out in the above description is susceptible of numerous modifications without departing from the spirit of the present invention. For example, it should be noted that while element 95 can be removed from solutions of neutron irradiated uranium or plutonium by means of the carrier methods herein set forth, said element may also be removed from other aqueous or non-aqueous liquid media in addition to those resulting from the solution of uranium or plutonium in a suitable acid utilizing methods similar in principle to those herein set forth.

What is claimed is:

1. In a process for the synthesis of element 95, the steps which comprise bombarding uranium with subatomic particles having an atomic mass greater than one for a period of time sufficient to produce a transuranic fraction comprising predominantly plutonium which contains at least about 0.01% of the isotope $94^{241}$ and aging said plutonium for a further period of time such that said isotope present therein decays into a detectable quantity of element 95.

2. The process of claim 1 in which the subatomic particles are deuterons.

3. The process of claim 1 in which the subatomic particles are neutrons.

4. In a process for the synthesis of element 95, the steps which comprise bombarding plutonium with deuterons for a period of time sufficient to convert at least about 0.01% of said plutonium to the isotope $94^{241}$, and thereafter aging the bombarded material for a further period of time such that the $94^{241}$ present decays into a detectable quantity of element 95.

5. In a process for the synthesis of element 95, the steps which comprise bombarding plutonium with neutrons for a period of time sufficient to convert at least about 0.01% of said plutonium to the isotope $94^{241}$, and thereafter aging the bombarded material for a further period of time such that the $94^{241}$ present decays into a detectable quantity of element 95.

6. In a process for the synthesis of element 95, the steps which comprise bombarding plutonium with deuterons at energies of at least 10 mev. for a period of time sufficient to convert at least about 0.01% of said plutonium to the isotope $94^{241}$, and thereafter aging the bombarded material for a further period of time such that the $94^{241}$ present decays into a detectable quantity of element 95.

7. In a process for the synthesis of element 95, the steps which comprise bombarding plutonium with deuterons at energies of between about 14 to 16 mev. for a period of time sufficient to convert at least about 0.01% of said plutonium to the isotope $94^{241}$, and thereafter aging the bombarded material for a further period of time such that the $94^{241}$ decays into a detectable quantity of element 95.

8. In a process for the synthesis of element 95, the steps which comprise bombarding plutonium with neutrons at a neutron flux of at least about $10^{13}$ neutrons/cm.$^2$/sec. for a period of time sufficient to convert at least about 0.01% of said plutonium to the isotope $94^{241}$, and thereafter aging the bombarded material for a further period of time such that the $94^{241}$ present decays into a detectable quantity of element 95.

9. In a process for the synthesis of element 95, the steps which comprise subjecting plutonium to bombardment with slow neutrons having energies of from between 0 and 0.3 ev. for a period of time sufficient to convert at least about 0.01% of said plutonium to the isotope $94^{241}$, and thereafter aging the bombarded material for a further period of time such that the $94^{241}$ present decays into a detectable quantity of element 95.

10. In a process for the synthesis of element 95, the steps which comprise subjecting a mixture of $U^{238}$ and a fissionable material to a self-sustaining neutronic chain reaction, aging the reacted material for a period of time sufficient to produce a transuranic fraction comprising predominantly plutonium which contains at least about 0.01% of the isotope $94^{241}$, and further aging said plutonium for a further period of time such that said isotope present therein decays into a detectable quantity of element 95.

11. In a process for the synthesis of element 95, the steps which comprise subjecting a mixture of $U^{238}$ and $U^{235}$ to a self-sustaining neutronic chain reaction, aging the reacted material for a period of time sufficient to produce a transuranic fraction comprising predominantly plutonium which contains at least about 0.01% of the isotope $94^{241}$, and aging said plutonium for a further period of time such that said isotope present therein decays into a detectable quantity of element 95.

12. In a process for the synthesis of element 95, the steps which comprise bombarding uranium with subatomic particles having an atomic mass greater than one for a period of time sufficient to produce a transuranic fraction comprising predominantly plutonium which contains at least about 0.01% of the isotope $94^{241}$, aging said plutonium for a further period of time such that said isotope present therein decays into a detectable quantity of element 95, thereafter dissolving the aged product in an aqueous acidic solution, contacting said solution with a carrier precipitate comprising a water-insoluble salt of a rare earth whereby element 95 values become associated therewith, and removing said carrier together with associated element 95 values from the solution.

13. In a process for the synthesis of element 95, the steps which comprise bombarding uranium with subatomic particles having an atomic mass greater than one for a period of time sufficient to produce a transuranic fraction comprising predominantly plutonium which contains at least about 0.01% of the isotope $94^{241}$, aging said plutonium for a further period of time such that said isotope present therein decays into a detectable quantity of element 95, thereafter dissolving the aged product in an aqueous acidic solution, oxidizing the plutonium contained in the resulting solution to a valent state greater than $+4$, contacting said solution with a carrier precipitate comprising a water-insoluble salt of a rare earth whereby element 95 values become associated therewith, and removing said carrier together with associated element 95 values from the solution.

14. The process of claim 13 in which the carrier is lanthanum fluoride.

15. The process of claim 13 in which the carrier is cerous fluoride.

16. The process of claim 12 in which the carrier is lanthanum fluoride.

17. The process of claim 12 in which the carrier is cerous fluoride.

References Cited in the file of this patent

FOREIGN PATENTS

| | | |
|---|---|---|
| 114,150 | Australia | May 2, 1940 |
| 114,151 | Australia | May 3, 1940 |

OTHER REFERENCES

J. Chem. Education 22, 619–23 (1945).

UNITED STATES PATENT OFFICE
CERTIFICATE OF CORRECTION

Patent No. 3,044,944                      July 17, 1962

Glenn T. Seaborg et al.

It is hereby certified that error appears in the above numbered patent requiring correction and that the said Letters Patent should read as corrected below.

Column 2, line 39, after "$95^{242}$" insert -- and --; column 5, line 28, for "caking" read -- making --; column 10, line 31, for "and" read -- from --; line 35, strike out "of".

Signed and sealed this 2nd day of April 1963.

(SEAL)

Attest:

ESTON G. JOHNSON

Attesting Officer

DAVID L. LADD

Commissioner of Patents